United States Patent
Neag et al.

(10) Patent No.: US 12,448,825 B2
(45) Date of Patent: Oct. 21, 2025

(54) QUICK RELEASE AUTOMOTIVE CHECK STRAP

(71) Applicant: FCA US LLC, Auburn Hills, MI (US)

(72) Inventors: Dorinel Neag, Commerce Township, MI (US); Carl Mather, Lake Orion, MI (US); Frederick F Bender, South Lyon, MI (US)

(73) Assignee: FCA US LLC, Auburn Hills, MI (US)

( * ) Notice: Subject to any disclaimer, the term of this patent is extended or adjusted under 35 U.S.C. 154(b) by 161 days.

(21) Appl. No.: 18/344,304

(22) Filed: Jun. 29, 2023

(65) Prior Publication Data

US 2025/0003269 A1  Jan. 2, 2025

(51) Int. Cl.
*E05C 17/20* (2006.01)

(52) U.S. Cl.
CPC ........ *E05C 17/203* (2013.01); *E05Y 2900/531* (2013.01)

(58) Field of Classification Search
CPC .... E05B 17/2023; E05B 73/00; E05B 83/367; E05B 2015/1692; E05C 17/18; Y10T 292/28; Y10T 292/286; Y10T 292/289; Y10T 292/34; Y10T 292/379; Y10T 292/388; Y10T 292/432; Y10T 292/03
USPC .......................................................... 16/82
See application file for complete search history.

(56) References Cited

U.S. PATENT DOCUMENTS

| | | | |
|---|---|---|---|
| 5,862,570 A | 1/1999 | Lezuch et al. | |
| 6,438,794 B2* | 8/2002 | Ng | E05C 17/203 16/82 |
| 6,711,778 B2* | 3/2004 | Sparkman | E05C 17/203 16/82 |
| 9,822,570 B2 | 11/2017 | Jaranson et al. | |
| 2009/0072582 A1 | 3/2009 | Elliott et al. | |
| 2014/0059802 A1* | 3/2014 | Matsuki | E05C 17/203 16/82 |
| 2019/0010740 A1* | 1/2019 | Haeske | E05B 53/005 |
| 2021/0131141 A1* | 5/2021 | Rossi | E05C 17/203 |
| 2023/0061227 A1* | 3/2023 | Neag | E05C 17/045 |

\* cited by examiner

*Primary Examiner* — Christine M Mills
*Assistant Examiner* — Yahya Sidky
(74) *Attorney, Agent, or Firm* — Jeremy J. Klobucar (57) ABSTRACT

A removable check strap assembly for a vehicle having a vehicle body and a vehicle door. The check strap assembly includes a bracket configured to be attached to the vehicle body; a check strap including a first end configured to be attached to the vehicle door and a second end defining an opening configured to be attached to the bracket; a pivot pin having a head and a shank, the opening of the second end of the check strap being configured to receipt of the shank of the pivot pin; and a retention spring including a proximate end attached to the head of the pivot pin and a distal end configured to mate with the shank. The bracket includes a notch configured for receipt of retention spring, and the distal end of the retention spring includes a key-hole shaped opening configured for receipt of the shank of the pivot pin.

5 Claims, 9 Drawing Sheets

QUICK RELEASE AUTOMOTIVE CHECK STRAP

FIELD

The present disclosure relates to a quick release check strap for a vehicle door.

BACKGROUND

This section provides background information related to the present disclosure which is not necessarily prior art.

A check strap is a device installed on a vehicle door that permits the door to stop at a specified interval when the vehicle door is opened. On some vehicles, the doors are designed to be removable. In order to remove the door, it is necessary to detach the check strap from location at which the check strap is attached the vehicle body, which can be time consuming.

SUMMARY

This section provides a general summary of the disclosure, and is not a comprehensive disclosure of its full scope or all of its features.

According to a first aspect, there is provided a removable check strap assembly for a vehicle having a vehicle body and a vehicle door. The check strap assembly includes a bracket configured to be attached to the vehicle body; a check strap including a first end configured to be attached to the vehicle door and a second end configured to be attached to the bracket, the second end defining an opening; a pivot pin having a head and a shank, the opening of the second end of the check strap being configured to receipt of the shank of the pivot pin; and a retention spring including a proximate end attached to the head of the pivot pin and a distal end configured to mate with the shank, wherein the bracket includes a notch configured for receipt of retention spring, and the distal end of the retention spring includes a key-hole shaped opening configured for receipt of the shank of the pivot pin.

According to the first aspect, the retention spring may be formed of spring steel.

According to the first aspect, the bracket includes a first lobe and a second lobe that are spaced apart from each other, and the second end of the check strap is configured to be located between the first and second lobes.

According to the first aspect, one of the first and second lobes includes the notch.

According to the first aspect, each of the first and second lobes includes an aperture having a bushing located therein.

According to the first aspect, the bushing includes a through-hole configured for receipt of the shank of the pivot pin.

According to the first aspect, the assembly may also include an annular spacer located between the bushing and respective first and second lobe.

According to the first aspect, the check strap is formed of a polymeric material.

According to a second aspect, there is provided a removable check strap assembly for a vehicle having a vehicle body and a vehicle door, the check strap assembly including a bracket configured to be attached to the vehicle body; a check strap including a first end configured to be attached to the vehicle door and a second end configured to be attached to the bracket, the second end defining an opening; a pivot pin having a push-button bonnet and a shank including a plurality of spring-biased retention members, the opening of the second end of the check strap being configured to receipt of the shank of the pivot pin; wherein the spring-biased retention members are movable between an extended and retracted position upon depression of a button of the push-button bonnet to permit the pivot pin to be removed from the opening of the check strap.

According to the second aspect, the bracket includes a first lobe and a second lobe that are spaced apart from each other, and the second end of the check strap is configured to be located between the first and second lobes.

According to the second aspect, each of the first and second lobes includes an aperture having a bushing located therein.

According to the second aspect, the bushing includes a through-hole configured for receipt of the shank of the pivot pin.

According to the second aspect, the assembly may also include an annular spacer located between the bushing and respective first and second lobe.

According to the second aspect, the spring-biased retention members, when in the extended position, lock the shank of the pivot pin relative to the bushing located in the aperture of the second lobe.

According to the second aspect, the check strap may be formed of a polymeric material.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. In some example embodiments, well-known device structures are not described in detail.

Figure 1A:
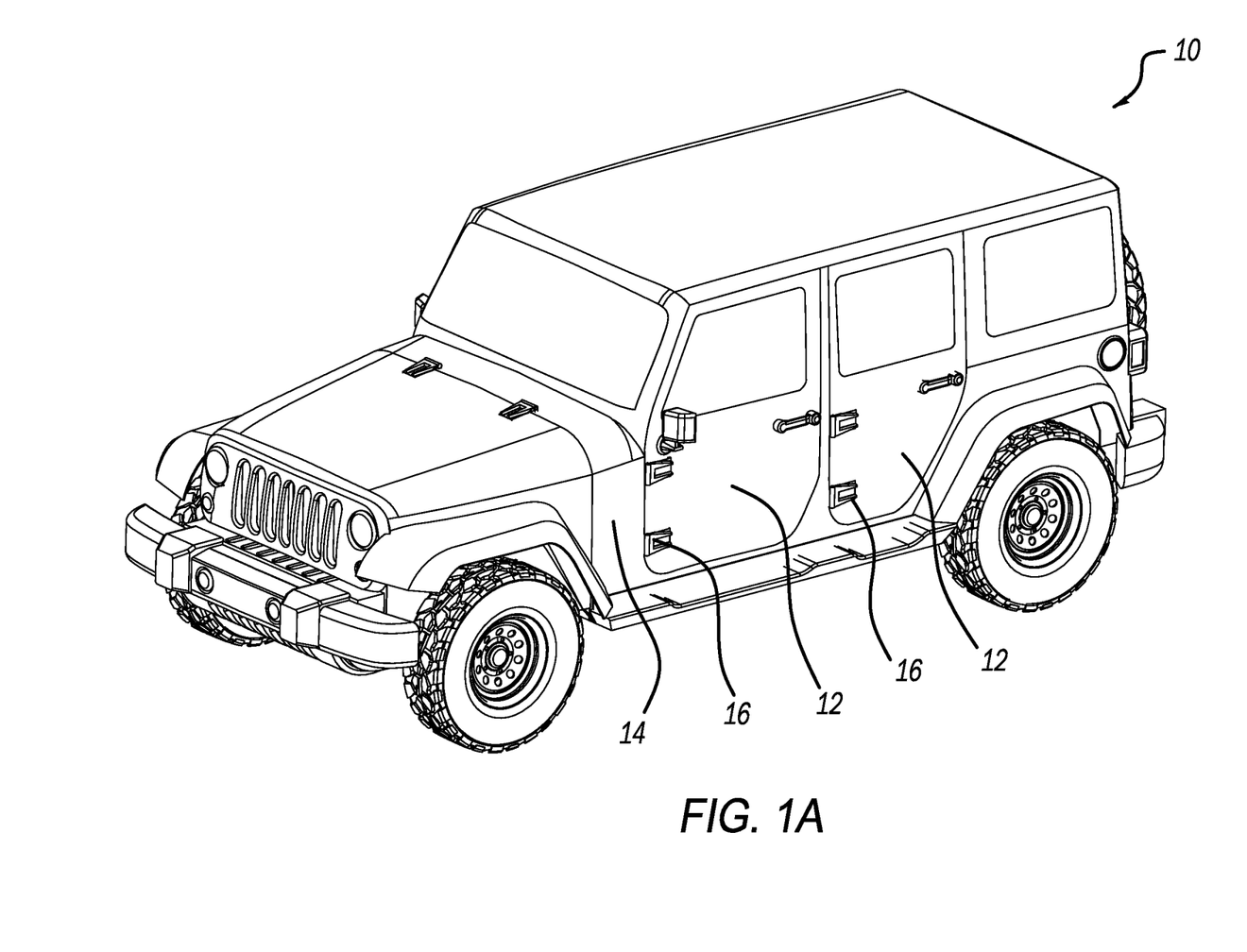
FIG. 1A is a perspective view of a vehicle having a plurality of doors.
Figure 1B:
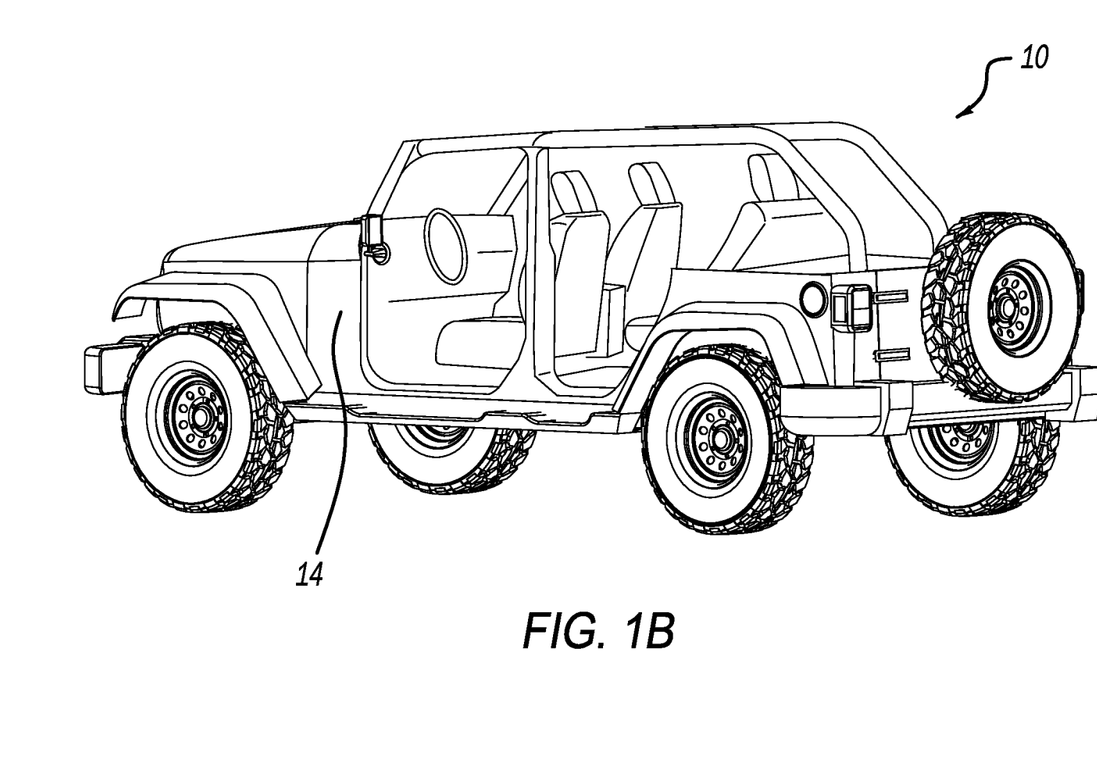
FIG. 1B is a perspective view of the vehicle illustrated in FIG. 1, with the doors removed.
Figure 2:
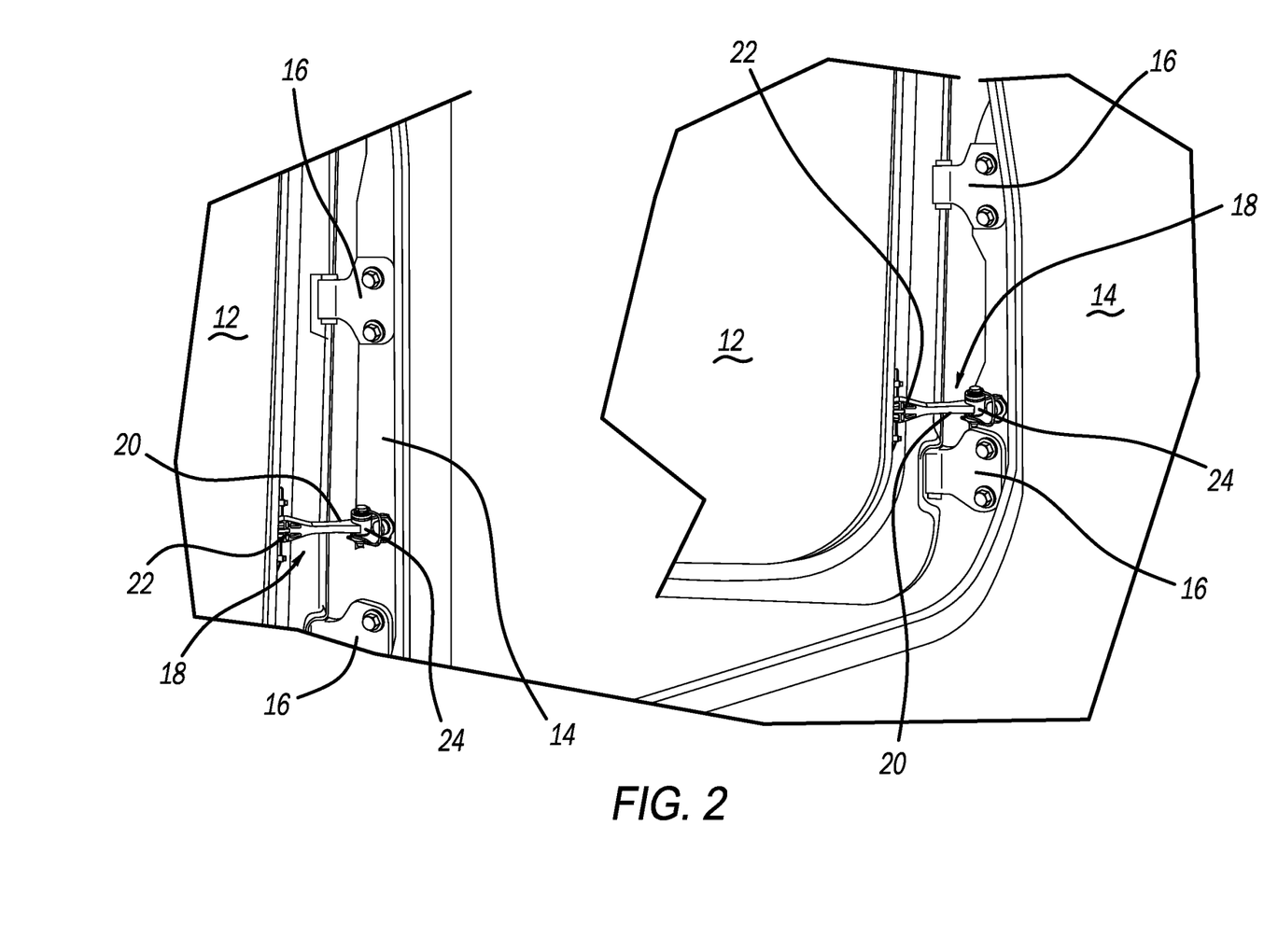
FIG. 2 is a perspective view of a vehicle door being opened relative to a vehicle body, and including a check strap assembly according to a principle of the present disclosure.
Figure 3:
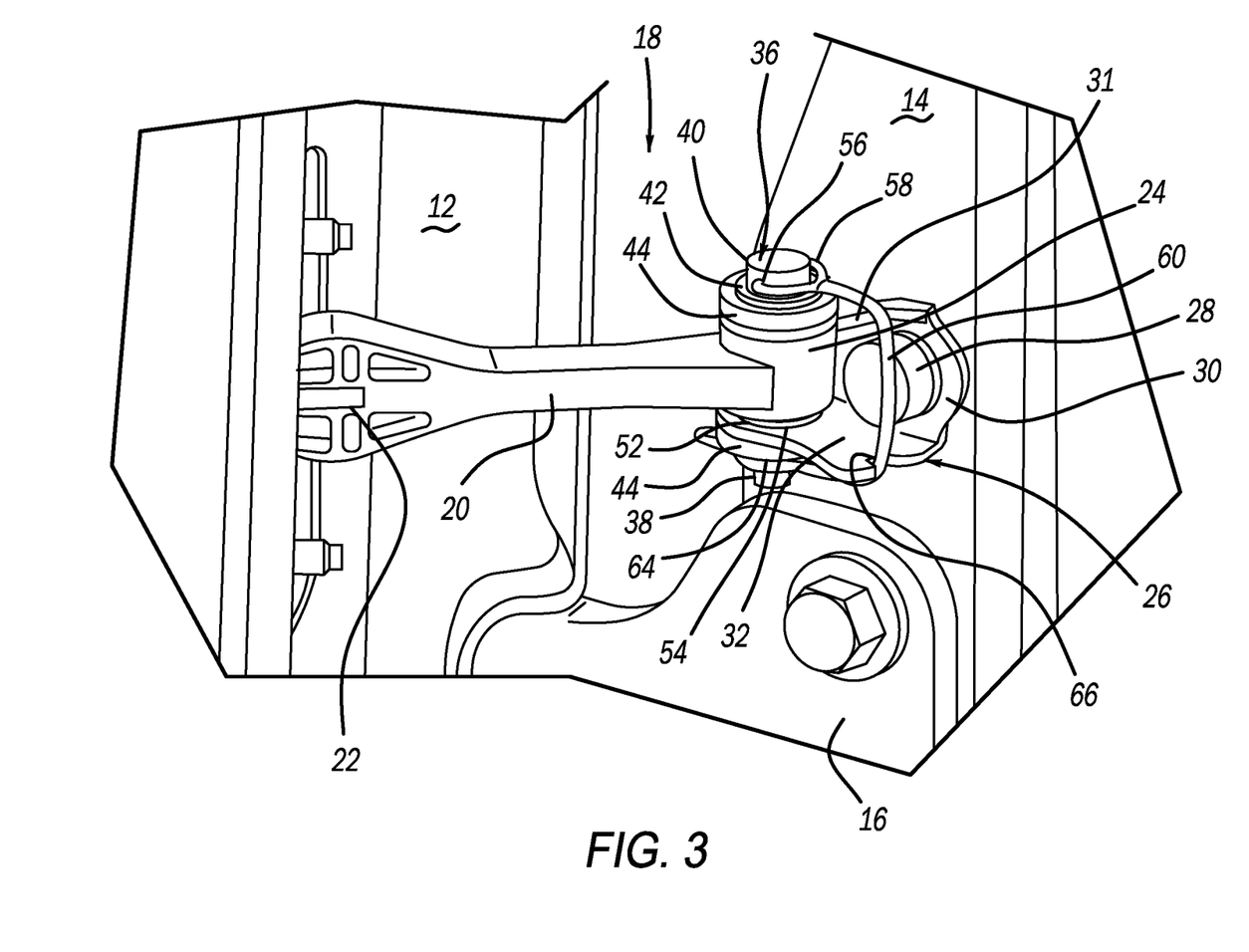
FIG. 3 is a perspective view of the check strap assembly according to a principle of the present disclosure.
Figure 4:
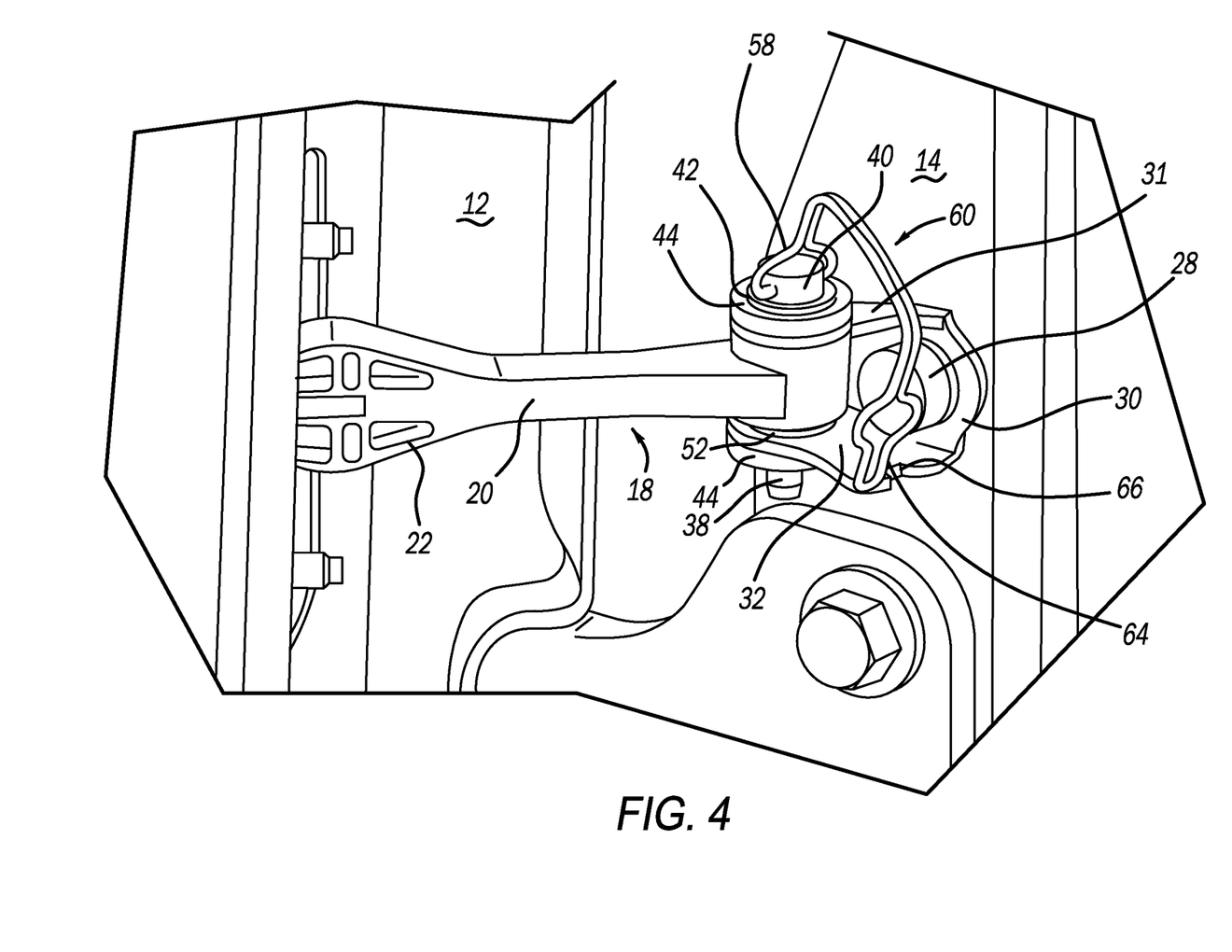
FIG. 4 illustrates a step in detaching the check strap assembly shown in FIG. 3 from a body of the vehicle.
Figure 5:
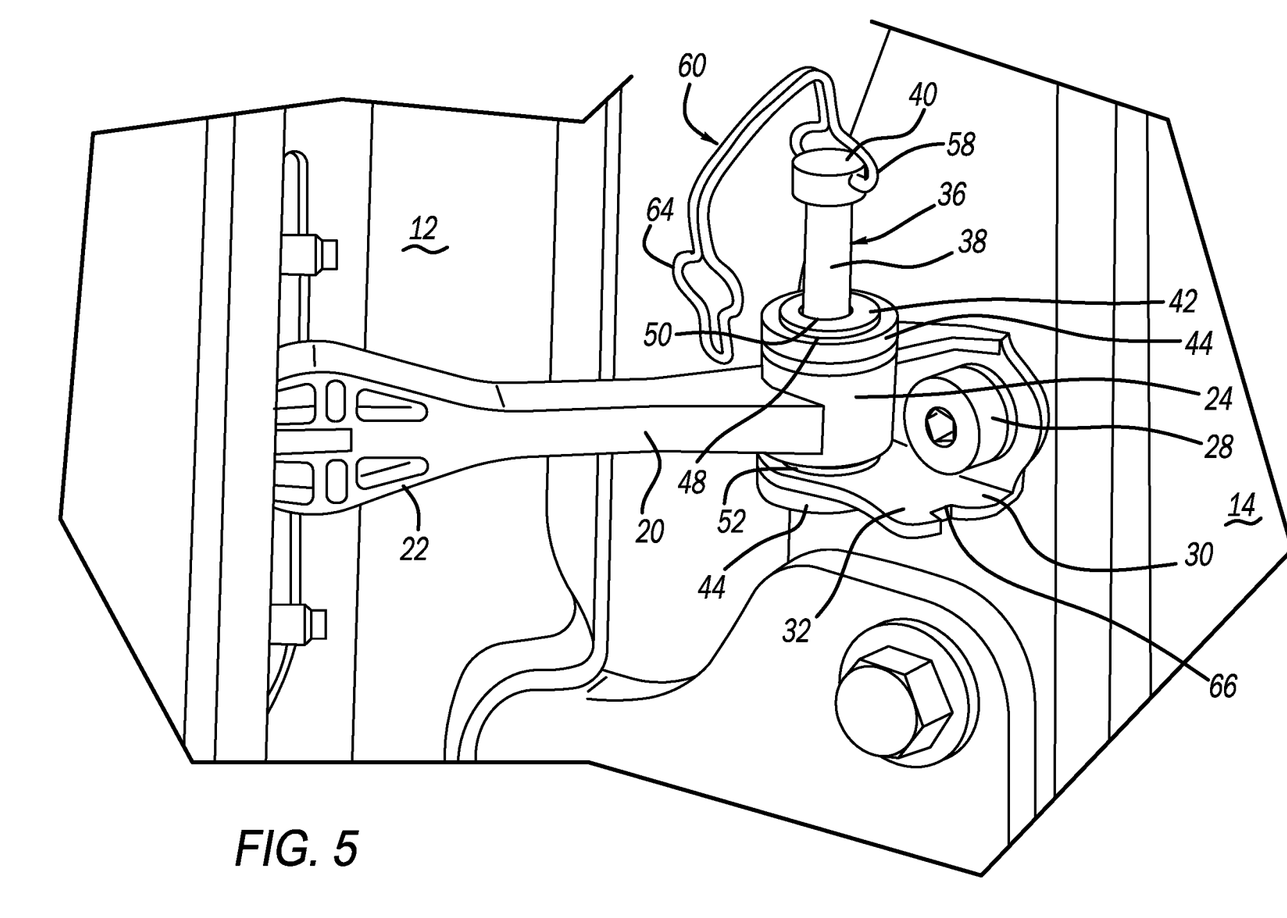
FIG. 5 illustrates another step in detaching the check strap assembly shown in FIG. 3 from the body of the vehicle.
Figure 6:
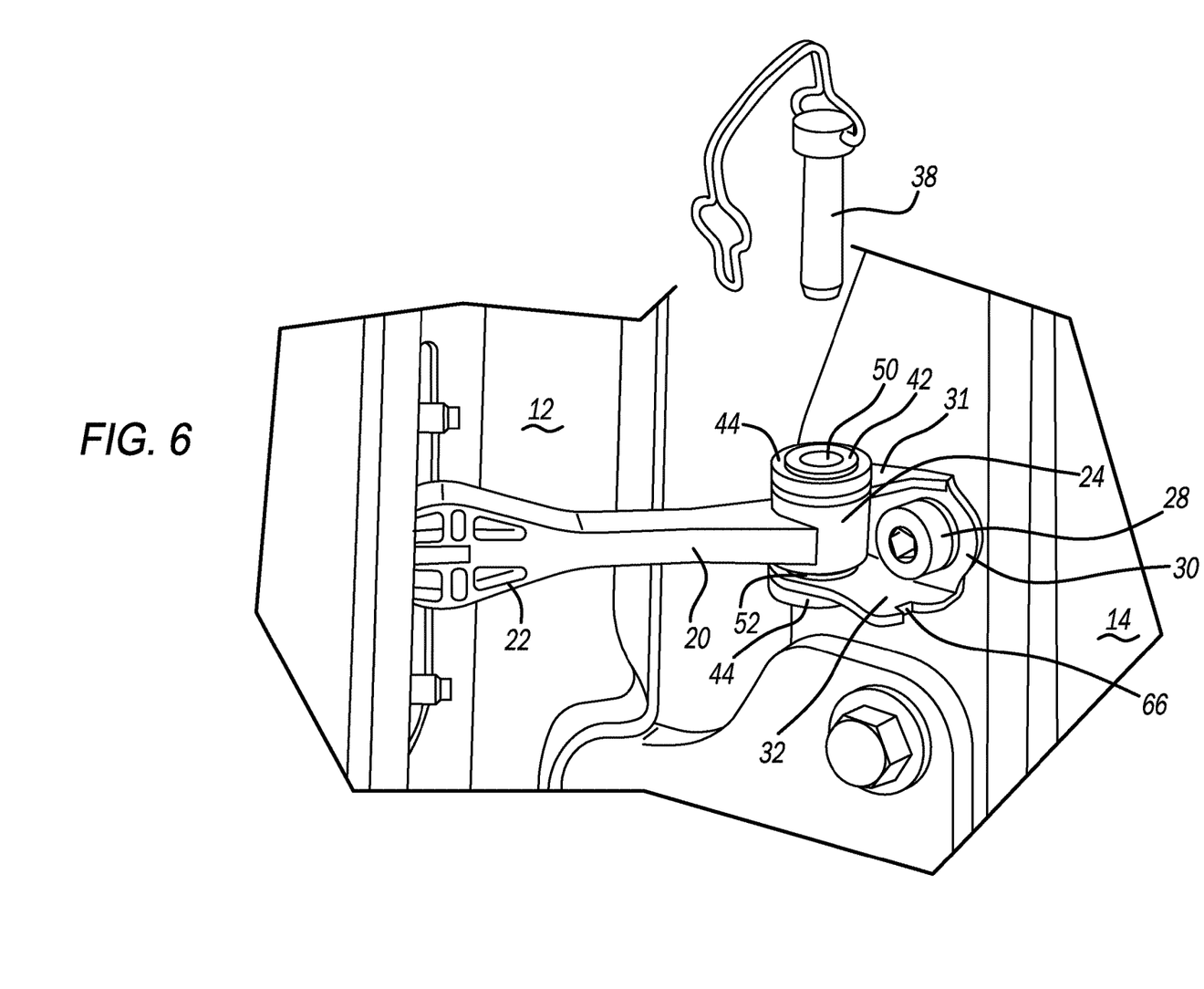
FIG. 6 illustrates yet another step in detaching the check strap assembly shown in FIG. 3 from the body of the vehicle.
Figure 7:
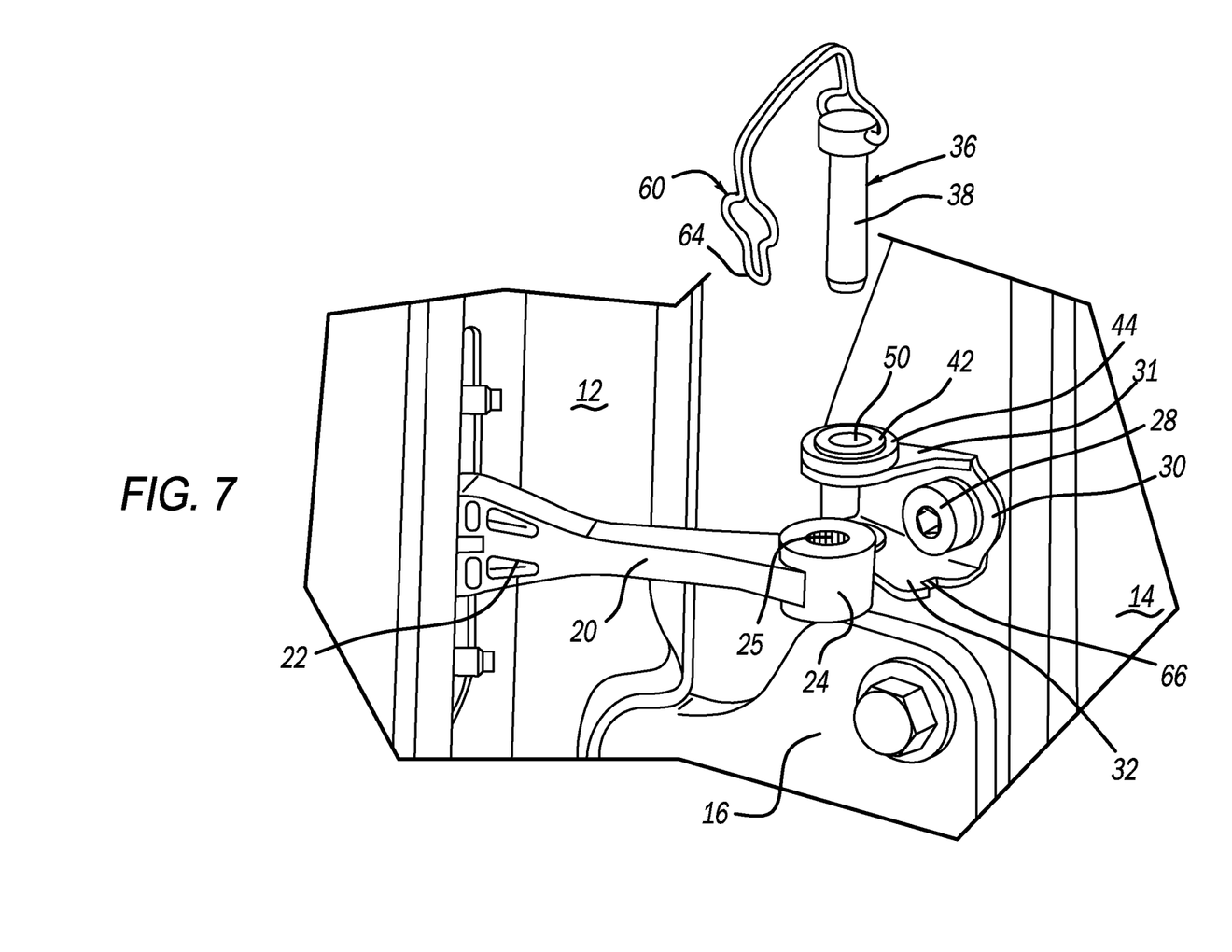
FIG. 7 illustrates the check strap assembly shown in FIG. 3 detached from the body of the vehicle.

FIG. 1A illustrates a vehicle 10 having a plurality of doors 12 attached thereto, and FIG. 1B illustrates the same vehicle 10 having the plurality of doors 12 removed. Doors 12 are attached to body 14 of the vehicle by a plurality of hinges 16.

Now referring to FIGS. 2 to 6, it can be seen that when a door 12 is opened relative to the vehicle body 14, the door 12 is maintained at a selected position by a check strap assembly 18. Check strap assembly 18 includes a check strap 20, which may be formed of a rigid polymeric material such as polyamide (Nylon®), having a first end 22 attached to a detent housing (not shown) that is located within an interior of the door 12. The detent housing permits the check strap 20 to hold the door 12 open at a plurality of different positions relative to body 14, as is known in the art and will not be described further. It should be noted that while polyamide has been used as an example material for check strap 20, it should be understood that other polymeric materials and metal materials are contemplated. Polymeric materials are preferred in order to reduce the mass of assembly 18 and the overall mass of vehicle 10.

Check strap 20 also includes an opposite second end 24 that is cylindrically shaped and includes a bore 25 (FIG. 6) attached to bracket 26 that is fixed to body 14 by a fastener 28 such as a bolt. It should be understood, however, that bracket 26 may be fixed to body 14 by other means of attachment including, for example, welding. Bracket 26 may be formed of a rigid material such as steel, aluminum, or some other type of metal material. Bracket 26 includes a plate 30 having an aperture (not shown) configured for receipt of fastener 28, and a first lobe 31 and a second lobe 32 unitary therewith that extend outward from plate 30. First and second lobes 31, 32 are spaced apart from each other such that cylindrical second end 24 of check strap 20 may be located therebetween.

First and second lobes 31, 32 each include through-holes 34 that are axially aligned with each other, and designed to axially align with bore 25 of cylindrical second end 24 of check strap 20. Through-holes 34 and bore 25 are axially aligned to receive a pin 36 that retains cylindrical second end 24 of check strap 20 in bracket 26, and permits cylindrical second end 24 to rotate relative thereto. Pin 36, which may be formed of a rigid material such as a polymeric material (i.e., may be formed of the same material as check strap 20) or a metal material such as steel, aluminum, or some other type of metal material, includes a shank 38 that passes through through-holes 34 and bore 25, and a head 40 configured to rest upon first lobe 31 when pin 36 is inserted in through-holes 34 and bore 25. A first polymeric bushing 42 and first spacer 44 such as a washer may be positioned between head 40 and an upper surface 46 of first lobe 31. Preferably, bushing 42 and spacer 44 are press-fit into an through-hole number formed in first lobe 31. An aperture 48 of spacer 44 is configured for receipt of first bushing 42, and bushing 42 includes an opening 50 configured for receipt of shank 38.

A second polymeric bushing 52 may be positioned between second end 24 of strap 20 and an upper surface 54 of second lobe 32. Preferably, second bushing 52 and spacer 44 are press-fit into an through-hole number formed in second lobe 32. Second bushing 52 may also include an opening 50 that may be aligned with through-holes 34 and bore 25 of second end 24 of strap 20 that is configured for receipt of shank 38. Bushings 42, 52 permit smooth rotation of second end 24 of strap 20 about shank 38.

Head 40 of pin 36 includes a channel 56 that extends orthogonally relative to shank 38. Channel 56 is configured for receipt of a proximal end 58 of a retention spring 60 formed of a material such as spring steel that secures pin 36 to bracket 26. A distal end 62 of retention spring 60 defines a keyhole-shaped loop 64 that is configured to receive shank 38 of pin 36 therein. To maintain retention spring 60 in the correct location relative to bracket 26, second lobe 32 may include a notch 66 that acts as a seat for retention spring 60.

Now attachment of strap 20 to bracket 26 will be described. The following description assumes that door 12 has been attached to vehicle 10 by re-attaching hinges 16 of door 12 to vehicle body 14. Further, if second bushing 52 has not been press-fit is placed on upper surface 54 of second lobe 32 of bracket and its opening 50 is aligned with through-hole 34. Next, the second end 24 of strap 20 is located between first and second lobes 31, 32 and its bore 25 is aligned with through-holes 34 and opening 50 of second bushing 52. Then, first spacer 44 including first bushing 42 is placed upon upper surface 46 of first lobe 30, and its opening 50 is aligned relative to through-hole 34 of first lobe 30. Pin 36 including retention spring 60 attached thereto is inserted through the opening 50 of first bushing 42, through bore 25 of second end 24 of strap, and through the opening 50 of second bushing 52. Before locating retention spring 60 in notch 66, an optional second spacer 68 may be mated with shank 38 and placed in contact with a lower surface 70 of second lobe 32. Then, retention spring 60 may be mated with notch 66 and the key-hole shaped loop 64 mated with the larger-diameter opening 72 of key-hole shaped loop 64. Thus, check strap 20 is reliably secured to the bracket 26.

The above-described configuration is effective for quickly detaching check strap assembly 18 from body 14 of the vehicle 10. To detach the check strap assembly 18 form the body 14, a narrowed section 74 of key-hole shaped loop 64 may be gripped and pulled in a downward direction to disengage the larger-diameter opening 72 from shank 38. Once retention spring 60 is detached from shank 38, the spring 60 may be pulled in an upward direction. Because spring 60 is attached to head 40 of pin 36, the pulling in the upward direction will remove pin 36 from second end 24 of check strap 20 and bracket 26. Then, doors 12 may be fully detached from vehicle 10 by detaching the hinges 16 from the vehicle body 14.

Figure 8:
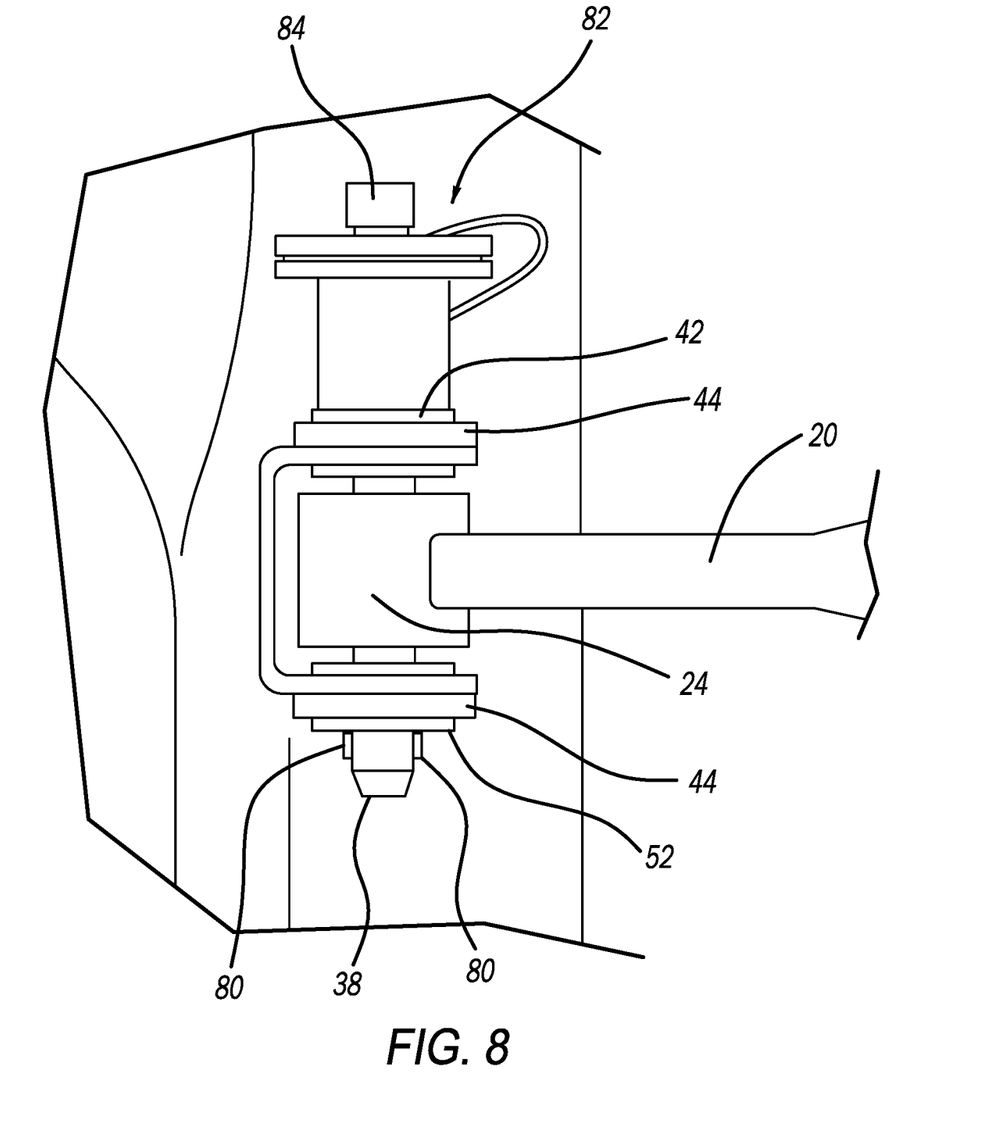
FIG. 8 is a perspective view of another check strap assembly according to a principle of the present disclosure.

While check strap assembly 18 has been described as including a spring 60 to maintain pin 36 in relation to bracket 26, it should be understood that other means may be used to maintain pin 36 in relation to bracket 26. As shown in FIG. 8, pin 36 may include spring-biased retention members 80 that may be actuated by a push-button bonnet 82 having a depressible button 84. To disengage pin 36 from bracket 28, the button 84 may be depressed which causes retention members 80 to retract, which then enables the user to pull pin 26 from bracket to enable check strap 20 to be disengaged from bracket 26.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A removable check strap assembly for a vehicle having a vehicle body and a vehicle door, the check strap assembly comprising:
   a bracket configured to be attached to the vehicle body;
   a check strap including a first end configured to be attached to the vehicle door and a second end configured to be attached to the bracket, the second end defining an opening;
   a pivot pin having a head and a shank, the opening of the second end of the check strap being configured for receipt of the shank of the pivot pin; and
   a retention spring including a proximate end attached to the head of the pivot pin and a distal end configured to mate with the shank,
   wherein the bracket includes a notch configured for receipt of retention spring, and the distal end of the retention spring includes a key-hole shaped opening configured for receipt of the shank of the pivot pin,
   the bracket includes a first lobe and a second lobe that are spaced apart from each other, and the second end of the check strap is configured to be located between the first and second lobes,
   one of the first and second lobes includes the notch, and each of the first and second lobes includes an aperture having a bushing located therein.

2. The check strap assembly according to claim 1, wherein the retention spring is formed of spring steel.

3. The check strap assembly according to claim 1, wherein the bushing includes a through-hole configured for receipt of the shank of the pivot pin.

4. The check strap assembly according to claim 1, further comprising an annular spacer located between the bushing and respective first and second lobe.

5. The check strap assembly according to claim 1, wherein the check strap is formed of a polymeric material.

* * * * *